(12) United States Patent
Zheng et al.

(10) Patent No.: US 12,472,640 B2
(45) Date of Patent: Nov. 18, 2025

(54) CONTROL METHOD AND SYSTEM FOR ARTICLE TRANSPORTATION BASED ON MOBILE ROBOT

(71) Applicant: GUANGDONG POLYTECHNIC NORMAL UNIVERSITY, Guangdong (CN)

(72) Inventors: Zhenxing Zheng, Guangdong (CN); Jian Ouyang, Guangdong (CN); Guifang Ye, Guangdong (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 197 days.

(21) Appl. No.: 18/474,790

(22) Filed: Sep. 26, 2023

(65) Prior Publication Data

US 2024/0123628 A1 Apr. 18, 2024

(30) Foreign Application Priority Data

Oct. 8, 2022 (CN) .......................... 202211230227.6

(51) Int. Cl.
*B25J 11/00* (2006.01)
*B25J 9/16* (2006.01)
(Continued)

(52) U.S. Cl.
CPC ........... *B25J 11/008* (2013.01); *B25J 9/1664* (2013.01); *B25J 9/1697* (2013.01); *B25J 13/06* (2013.01);
(Continued)

(58) Field of Classification Search
CPC ...... B25J 9/1664; B25J 9/1697; B25J 11/008; B25J 13/06; G06V 20/58; G06V 20/10;
(Continued)

(56) References Cited

FOREIGN PATENT DOCUMENTS

CN 106950985 A * 7/2017 ............. G05D 1/101
CN 109324615 A 2/2019
(Continued)

OTHER PUBLICATIONS

Liang, Ke et al., "Improved Artificial Potential Field for Unknown Narrow Environments", 2004 IEEE International Conference on Robotics and Biomimetics, Aug. 22-26, 2004, Shenyang, China (Year: 2004).*

(Continued)

*Primary Examiner* — Ramon A. Mercado
*Assistant Examiner* — Noah W Stiebritz
(74) *Attorney, Agent, or Firm* — Pilloff Passino & Cosenza LLP; Rachel K. Pilloff; Sean A. Passino

(57) ABSTRACT

A control method and a control system based on a mobile robot are provided, which correspondingly obtain first feature information and second feature information according to a specific target object and a face region of the user present in region environment, and a delivery request message is sent to the mobile robot; the obstacle presence information is obtained during moving process of mobile robot along the moving path so as to adjust moving state of mobile robot; the corresponding third feature information is obtained according to the image of current region of mobile robot; whether the mobile robot performs an article unloading operation is controlled according to a comparison result between the third feature information and the second feature information; the efficient transportation paths are chose according to the moving path of the mobile robot, and the real-time situation of the destinations may be verified.

6 Claims, 6 Drawing Sheets

(51) Int. Cl.
*B25J 13/06* (2006.01)
*G05B 19/418* (2006.01)
*G06V 20/58* (2022.01)
*G06V 40/16* (2022.01)

(52) U.S. Cl.
CPC ....... *G05B 19/41895* (2013.01); *G06V 20/58* (2022.01); *G06V 40/172* (2022.01); *G05B 2219/39082* (2013.01)

(58) Field of Classification Search
CPC .. G06V 40/172; B60W 30/08; B60W 30/143; B60W 60/0015; B60W 2420/403; G05D 1/229; G05D 1/243; G05D 1/0214; G05D 1/0223; G05D 1/0246; G05D 2105/285; G05D 2111/10; G06Q 10/08; G05B 19/41895; G05B 2219/39082; G06T 7/73; G06T 7/246; G06T 2207/10028; G06T 2207/30201; G06T 2207/30261
See application file for complete search history.

(56) References Cited

FOREIGN PATENT DOCUMENTS

| CN | 110398972 A | | 11/2019 | |
|----|-------------|---|---------|---|
| CN | 110710852 A | * | 1/2020 | ............ G06Q 50/12 |
| CN | 115127574 A | | 9/2022 | |

OTHER PUBLICATIONS

Liang Ke et al., "Path Planning for Mobile Robot in Unknown Narrow Environments," Robot, Jan. 2005, pp. 52-62, vol. 27, No. 1.
Wang Shuping, "Study on Obstacle Detection and Obstacle Avoidance of Mobile Robot in Complex Indoor Environment," Jul. 2013.
First Office Action for China Application No. 202211230227.6.

* cited by examiner

Shooting a region environment of a user and the user to obtain a first image comprising a specific target object present in the region environment and a face region of the user; performing an analytic processing on the first image to obtain first feature information about the specific target object and second feature information about the face region of the user; generating a delivery request message according to the first feature information, the second feature information and article transportation information of the user, and sending the delivery request message to a corresponding mobile robot — S1

Determining a moving path for the mobile robot to perform an article transportation according to the delivery request message; obtaining obstacle presence information during a moving process of the mobile robot along the moving path, and adjusting a moving state of the mobile robot according to the obstacle presence information until the mobile robot reaches a region position of the user — S2

Instructing the mobile robot to shoot a current region of the mobile robot, so as to obtain a second image, and extracting third feature information about an image footage from the second image; controlling whether the mobile robot performs an article unloading operation according to a comparison result between the third feature information and the second feature information — S3

FIG. 1

Obtaining a moving direction angle value of the mobile robot when the mobile robot makes an evasive passing from a leftmost edge or a rightmost edge of the obstacle according to a distance between the mobile robot and a leftmost edge position point or a rightmost edge position point of the obstacle in the relative position information, a height value of the leftmost edge position point or the rightmost edge position point and a width of the mobile robot by using a following formula (1) — S201

Obtaining an optimal controlling and adjusting direction of the mobile robot according to the moving direction angle value of the mobile robot when the mobile robot makes the evasive passing from the leftmost edge or the rightmost edge of the obstacle, a rotating angle of the mobile robot rotating from the current moving path direction to a leftmost edge direction or a rightmost edge direction by using a following formula (2) — S202

Determining the moving speed of the mobile robot according to the volume information of the obstacle and a minimum distance value between the mobile robot and the obstacle in the relative position information by using a following formula (3) — S203

FIG. 3

$$\theta(a) = arcsin \frac{L}{2\times\sqrt{[S(a)]^2-[H(a)]^2}} \qquad (1)$$

FIG. 4A $$\varphi = \{3 - 2 \times argmin_{a=1, a=2}[\beta(a) + \theta(a)]\} \times \{\beta\{argmin_{a=1,a=2}[\beta(a) + \theta(a)]\} + \theta\{argmin_{a=1,a=2}[\beta(a) + \theta(a)]\}\} \quad (2)$$

FIG. 4B $$V(t) = V_m \times \left(1 - e^{-\frac{[D(t)]^3}{Q}}\right) + V_0 \times e^{-\frac{[D(t)]^3}{Q}} \qquad (3)$$

FIG. 4C

CONTROL METHOD AND SYSTEM FOR ARTICLE TRANSPORTATION BASED ON MOBILE ROBOT

CROSS-REFERENCE TO RELATED APPLICATIONS

This application claims priority to Chinese Patent Application No. 202211230227.6, filed on Oct. 8, 2022, the contents of which are hereby incorporated by reference.

TECHNICAL FIELD

The application relates to the technical field of robot control, and in particular to a control method and a control system based on a mobile robot.

BACKGROUND

Robots are mobile and load-bearing, and they may undertake the corresponding article transportation tasks. The existing robots usually move in a point-to-point way in the process of article transportation, and they may only perform article transportation along a fixed path, which may not adapt to different actual article transportation needs or different paths of article transportation, and may reduce the article transportation efficiency of the robot. In addition, the existing robot directly unloads the articles after arriving at the destination, which does not verify the real-time situation of the destination, thus failing to ensure the normal and successful delivery of the articles and improve the reliability of the robot in article transportation.

SUMMARY

Aiming at the defects in the prior art, the application provides a control method and a control system based on a mobile robot, which correspondingly obtain first feature information and second feature information according to a specific target object present in the region environment of the user and a face region of the user, and a delivery request message is sent to the mobile robot; the obstacle presence information is obtained during the moving process of the mobile robot along the moving path so as to adjust the moving state of the mobile robot; the corresponding third feature information is obtained according to the image of the current region of the mobile robot when the mobile robot is instructed to reach the region position of the user; whether the mobile robot performs an article unloading operation is controlled according to a comparison result between the third feature information and the second feature information; the moving path of the mobile robot may be determined according to the region of the user, so that the mobile robot may adapt to different article transportation destinations and choose efficient transportation paths, and the real-time situation of the destinations may be verified, so as to ensure the normal and successful delivery of the articles and improve the reliability of the robot in article transportation.

The application provides a control method based on a mobile robot, including following steps:

S1, shooting a region environment of a user and the user to obtain a first image including a specific target object present in the region environment and a face region of the user; performing an analytic processing on the first image to obtain first feature information about the specific target object and second feature information about the face region of the user; generating a delivery request message according to the first feature information, the second feature information and article transportation information of the user, and sending the delivery request message to a corresponding mobile robot;

S2, determining a moving path for the mobile robot to perform an article transportation according to the delivery request message; obtaining obstacle presence information during a moving process of the mobile robot along the moving path, and adjusting a moving state of the mobile robot according to the obstacle presence information until the mobile robot reaches a region position of the user;

and S3, instructing the mobile robot to shoot a current region of the mobile robot, so as to obtain a second image, and extracting third feature information about an image footage from the second image; controlling whether the mobile robot performs an article unloading operation according to a comparison result between the third feature information and the second feature information.

Further, in the S1, shooting the region environment of the user and the user to obtain the first image including the specific target object present in the region environment and the face region of the user and performing the analytic processing on the first image to obtain the first feature information about the specific target object and the second feature information about the face region of the user specifically includes:

scanning and shooting the region environment of the user and the face region of the user to obtain the first image including the specific target object present in the region environment and the face region of the user; where the specific target object includes an environment position identifier present in the region environment; and performing an image footage element contour recognition processing on the first image to obtain first contour feature information of the specific target object in the image footage and second contour feature information of the face region of the user in the image footage;

and in the S1, generating the delivery request message according to the first feature information and the second feature information, and sending the delivery request message to the corresponding mobile robot specifically includes:

determining symbol semantic information of the environment position identifier according to the first contour feature information, and then determining position information of the region environment of the user according to the symbol semantic information;

determining weight information of an article transported by the mobile robot as required by the user according to the article transportation information of the user;

determining moving power consumption of the mobile robot completing a current article transportation task according to the position information and the weight information, and selecting a matching mobile robot according to the moving power consumption; and packaging the position information and the second contour feature information to form the delivery request message, and sending the delivery request message to a selected mobile robot.

Further, in the S2, determining the moving path for the mobile robot to perform the article transportation according to the delivery request message specifically includes:

determining the moving path for the mobile robot to perform the article transportation according to the position information of the region environment of the user and current position information of the selected mobile robot;

and in the S2, obtaining the obstacle presence information during the moving process of the mobile robot along the moving path, and adjusting the moving state of the mobile robot according to the obstacle presence information until the mobile robot reaches the region position of the user specifically includes:

instructing a camera of the mobile robot to collect a corresponding moving environment scene image when the mobile robot verifies the moving process of the moving path, and performing a recognition processing on a moving environment scene image to determine volume information of an obstacle present on the moving path of the mobile robot and relative position information of the obstacle and the mobile robot; and adjusting a moving speed and a direction of the mobile robot according to the volume information and the relative position information until the mobile robot reaches the region position of the user;

Further, in the S2, adjusting the moving speed and the direction of the mobile robot according to the volume information and the relative position information until the mobile robot reaches the region position of the user specifically includes:

S201, obtaining a moving direction angle value of the mobile robot when the mobile robot makes an evasive passing from a leftmost edge or a rightmost edge of the obstacle according to a distance between the mobile robot and a leftmost edge position point or a rightmost edge position point of the obstacle in the relative position information, a height value of the leftmost edge position point or the rightmost edge position point and a width of the mobile robot by using a following formula (1), $$\theta(a) = \arcsin \frac{L}{2 \times \sqrt{[S(a)]^2 - [H(a)]^2}} \quad (1)$$

where θ(a) represents the moving direction angle value of the mobile robot when the mobile robot makes the evasive passing from an a-th utmost edge side of the obstacle, and when a current moving path direction of the mobile robot is facing the a-th utmost edge side of the obstacle, the evasive passing is realizable by rotating at least an angle of θ(a); where a value of a is 1 or 2, and when a=1, θ(a) represents the moving direction angle value of the mobile robot when the mobile robot makes the evasive passing from the rightmost edge of the obstacle; when a=2, θ(a) represents the moving direction angle value of the mobile robot when the mobile robot makes the evasive passing from the leftmost edge of the obstacle; L represents the width of the mobile robot; H (a) represents the height value of a position point on the utmost edge side in an a-th direction of the obstacle; S (a) represents a distance between the mobile robot and the position point on the utmost edge side in the a-th direction of the obstacle in the relative position information of the mobile robot;

S202, obtaining an optimal controlling and adjusting direction of the mobile robot according to the moving direction angle value of the mobile robot when the mobile robot makes the evasive passing from the leftmost edge or the rightmost edge of the obstacle, a rotating angle of the mobile robot rotating from the current moving path direction to a leftmost edge direction or a rightmost edge direction by using a following formula (2), $$\varphi = \{3 - 2 \times \mathrm{argmin}_{a=1,a=2}[\beta(a)+\theta(a)]\} \times \{\beta\{\mathrm{argmin}_{a=1,a=2}[\beta(a)+\theta(a)]\} + \theta\{\mathrm{argmin}_{a=1,a=2}[\beta(a)+\theta(a)]\}\} \quad (2)$$

where φ represents the optimal controlling and adjusting direction for the mobile robot to make the evasive passing from the current moving path direction; if φ≥0, the mobile robot rotates a φ angle from the current moving path direction to the right and then moves forward to make the evasive passing; if φ<0, the mobile robot rotates a −φ angle from the current moving path direction to the left and then moves forward to make the evasive passing; β(a) represents that a rotating angle value of the mobile robot from the current moving path direction to an a-th utmost edge side direction; argmin$_{a=1,a=2}$[β(a)+θ(a)] represents that a=1 and 2 are substituted into brackets to get an a value to make the brackets get a minimum value;

and S203, determining the moving speed of the mobile robot according to the volume information of the obstacle and a minimum distance value between the mobile robot and the obstacle in the relative position information by using a following formula (3), $$V(t) = V_m \times \left(1 - e^{-\frac{[D(t)]^3}{Q}}\right) + V_0 \times e^{-\frac{[D(t)]^3}{Q}} \quad (3)$$

where V(t) represents the moving speed of the mobile robot at a current moment; $V_m$ represents a maximum moving speed of the mobile robot; $V_0$ represents a minimum moving speed of the mobile robot; t represents the current moment; D(t) represents the minimum distance value between the mobile robot and the obstacle in the relative position information at the current moment; Q represents a volume value of the obstacle in the volume information of the obstacle; e represents a natural constant.

Further, in the S3, instructing the mobile robot to shoot the current region of the mobile robot, so as to obtain the second image, and extracting the third feature information about the image footage from the second image specifically includes:

instructing the mobile robot to scan and shoot the current region of the mobile robot to obtain the second image when the mobile robot reaches the region position of the user; and extracting a face footage part present in the second image, and performing a face contour recognition processing on the face footage part to obtain third contour feature information corresponding to the face footage part;

and in the S3, controlling whether the mobile robot performs the article unloading operation according to the comparison result between the third feature information and the second feature information specifically includes:

comparing the third contour feature information with the second contour feature information to obtain a contour similarity value of the third contour feature information and the second contour feature information; where if the contour similarity value is greater than or equal to a preset similarity threshold, the mobile robot performs the article unloading operation; and if the contour similarity value is smaller than the preset similarity threshold, the mobile robot doesn't perform the article unloading operation.

The application also provides a control system based on the mobile robot, including:

a user terminal used for shooting the region environment of the user and the user, and obtaining the first image including the specific target object present in the region environment and the face region of the user; performing the analytic processing on the first image to obtain the first feature information about the specific target object and the second feature information about the face region of the user;

where the user terminal is also used for generating the delivery request message according to the first feature information, the second feature information and the article transportation information of the user, and sending the delivery request message to the corresponding mobile robot;

a first robot control terminal used for determining the moving path for the mobile robot to perform the article transportation according to the delivery request message;

where the first robot control terminal is also used for obtaining the obstacle presence information during the moving process of the mobile robot along the moving path, and adjusting the moving state of the mobile robot according to the obstacle presence information until the mobile robot reaches the region position of the user; and a second robot control terminal used for instructing the mobile robot to shoot the current region of the mobile robot, so as to obtain the second image, and extracting the third feature information about the image footage from the second image;

where the second robot control terminal is also used for controlling whether the mobile robot performs the article unloading operation according to the comparison result between the third feature information and the second feature information.

Further, shooting the region environment of the user and the user to obtain the first image including the specific target object present in the region environment and the face region of the user and performing the analytic processing on the first image to obtain the first feature information about the specific target object and the second feature information about the face region of the user by the user terminal specifically includes:

scanning and shooting the region environment of the user and the face region of the user by the user terminal to obtain the first image including the specific target object present in the region environment and the face region of the user; where the specific target object includes the environment position identifier present in the region environment; and performing the image footage element contour recognition processing on the first image to obtain the first contour feature information of the specific target object in the image footage and the second contour feature information of the face region of the user in the image footage;

where generating the delivery request message according to the first feature information, the second feature information and the article transportation information of the user, and sending the delivery request message to the corresponding mobile robot by the user terminal specifically includes:

determining the symbol semantic information of the environment position identifier according to the first contour feature information, and then determining the position information of the region environment of the user according to the symbol semantic information by the user terminal;

determining the weight information of the article transported by the mobile robot as required by the user according to the article transportation information of the user;

determining the moving power consumption of the mobile robot completing the current article transportation task according to the position information and the weight information, and sending the moving power consumption to a mobile robot management platform, so as to select the matching mobile robot; and then packaging the position information and the second contour feature information to form the delivery request message, and sending the delivery request message to the selected mobile robot.

Further, determining the moving path for the mobile robot to perform the article transportation according to the delivery request message by the first robot control terminal specifically includes:

determining the moving path for the mobile robot to perform the article transportation according to the position information of the region environment of the user and the current position information of the selected mobile robot;

and obtaining the obstacle presence information during the moving process of the mobile robot along the moving path, and adjusting the moving state of the mobile robot according to the obstacle presence information until the mobile robot reaches the region position of the user by the first robot control terminal specifically includes:

instructing the camera of the mobile robot to collect the corresponding moving environment scene image, and performing the recognition processing on the moving environment scene image to determine the volume information of the obstacle present on the moving path of the mobile robot and the relative position information of the obstacle and the mobile robot by the first robot control terminal; and adjusting the moving speed and the direction of the mobile robot according to the volume information and the relative position information until the mobile robot reaches the region position of the user.

Further, instructing the mobile robot to shoot the current region of the mobile robot, so as to obtain the second image, and extracting the third feature information about the image footage from the second image by the second robot control terminal specifically includes:

instructing the mobile robot by the second robot control terminal to scan and shoot the current region of the mobile robot to obtain the second image when the mobile robot reaches the region position of the user; and extracting the face footage part present in the second image, and performing the face contour recognition processing on the face footage part to obtain the third contour feature information corresponding to the face footage part;

and controlling whether the mobile robot performs the article unloading operation according to the comparison result between the third feature information and the second feature information by the second robot control terminal specifically includes:

comparing the third contour feature information with the second contour feature information by the second robot control terminal to obtain the contour similarity value of the third contour feature information and the second contour feature information; where if the contour similarity value is greater than or equal to the preset similarity threshold, the mobile robot performs the article unloading operation; and if the contour similarity value is smaller than the preset similarity threshold, the mobile robot doesn't perform the article unloading operation.

Compared with the prior art, the control method and the control system based on the mobile robot correspondingly obtain first feature information and second feature information according to a specific target object present in the region environment of the user and a face region of the user, and a delivery request message is sent to the mobile robot; the obstacle presence information is obtained during the moving process of the mobile robot along the moving path so as to adjust the moving state of the mobile robot; the corresponding third feature information is obtained according to the image of the current region of the mobile robot when the mobile robot is instructed to reach the region position of the user; whether the mobile robot performs an article unloading operation is controlled according to a comparison result between the third feature information and the second feature information; the moving path of the mobile robot may be determined according to the region of the user, so that the mobile robot may adapt to different article transportation destinations and choose efficient transportation paths, and the real-time situation of the destinations may be verified, so as to ensure the normal and successful delivery of the articles and improve the reliability of the robot in article transportation.

Other features and advantages of the application will be described in the following specification, and in part will be obvious from the description, or may be learned by implementation of the embodiment. The objectives and other advantages of the application may be realized and obtained by the structure particularly pointed out in the specification and claims, as well as the drawings.

The technical scheme of the embodiment will be further described in detail through the drawings and embodiments.

BRIEF DESCRIPTION OF THE DRAWINGS

In order to more clearly explain the embodiments of the present application or the technical scheme in the prior art, the drawings to be used in the description of the embodiments or the prior art will be briefly introduced below. Obviously, the drawings in the following description are only some embodiments of the present application, and other drawings may be obtained according to these drawings without creative work of those skilled in the art.

FIG. 1 is a flowchart schematic diagram of a control method based on a mobile robot provided by the present application.

FIG. 3 is a flowchart schematic diagram of the steps adjusting the moving speed and the direction of the mobile robot according to the volume information and the relative position information until the mobile robot reaches the region position of the user.

FIG. 4A shows the formula (1) when adjusting the moving speed and the direction of the mobile robot according to the volume information and the relative position information until the mobile robot reaches the region position of the user.

FIG. 4B shows the formula (2) when adjusting the moving speed and the direction of the mobile robot according to the volume information and the relative position information until the mobile robot reaches the region position of the user.

FIG. 4C shows the formula (3) when adjusting the moving speed and the direction of the mobile robot according to the volume information and the relative position information until the mobile robot reaches the region position of the user.

DETAILED DESCRIPTION OF THE EMBODIMENTS

Figure 2:
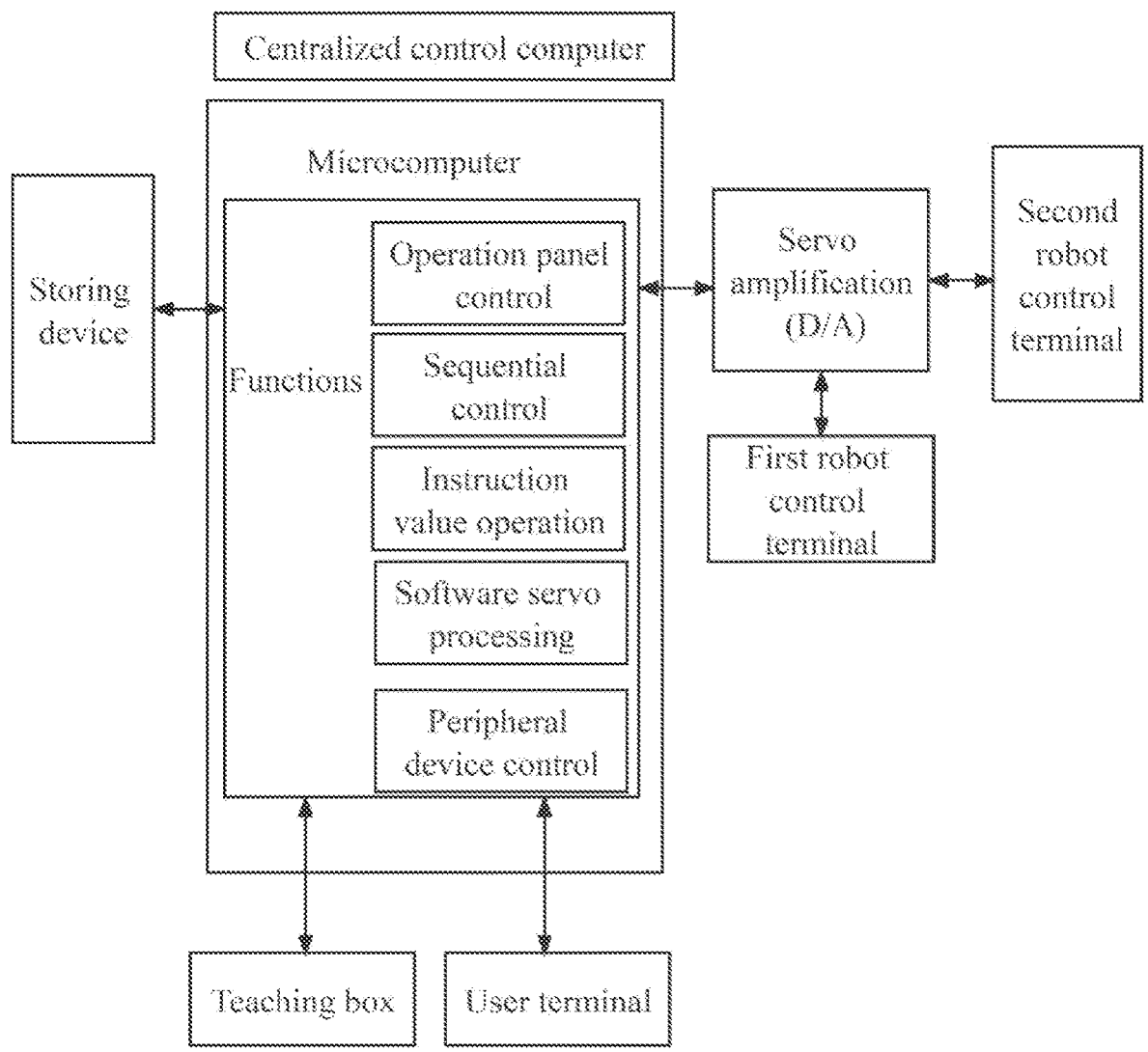
FIG. 2 is a structural schematic diagram of a control system based on the mobile robot provided by the present application.

In the following, the technical scheme in the embodiments of the application will be clearly and completely described with reference to the drawings. Obviously, the described embodiments are only a part of the embodiments of the application, but not the whole embodiments. Based on the embodiments in the present application, all other embodiments obtained by the ordinary technicians in the field without creative work belong to the scope of protection of the present application.

FIG. 1 is a flowchart schematic diagram of a control method based on a mobile robot provided by an embodiment of the present application. The control method based on the mobile robot includes the following steps:

S1, shooting a region environment of a user and the user to obtain a first image including a specific target object present in the region environment and a face region of the user; performing an analytic processing on the first image to obtain first feature information about the specific target object and second feature information about the face region of the user; generating a delivery request message according to the first feature information, the second feature information and article transportation information of the user, and sending the delivery request message to a corresponding mobile robot;

S2, determining a moving path for the mobile robot to perform an article transportation according to the delivery request message; obtaining obstacle presence information during a moving process of the mobile robot along the moving path, and adjusting a moving state of the mobile robot according to the obstacle presence information until the mobile robot reaches a region position of the user;

and S3, instructing the mobile robot to shoot a current region of the mobile robot, so as to obtain a second image, and extracting third feature information about an image footage from the second image; controlling whether the mobile robot performs an article unloading operation according to a comparison result between the third feature information and the second feature information.

The technical scheme above has the following advantages: the control method based on the mobile robot correspondingly obtain first feature information and second feature information according to a specific target object present in the region environment of the user and a face region of the user, and a delivery request message is sent to the mobile robot; the obstacle presence information is obtained during the moving process of the mobile robot along the moving path so as to adjust the moving state of the mobile robot; the corresponding third feature information is obtained according to the image of the current region of the mobile robot when the mobile robot is instructed to reach the region position of the user; whether the mobile robot performs an article unloading operation is controlled according to a comparison result between the third feature information and the second feature information; the moving path of the mobile robot may be determined according to the region of the user, so that the mobile robot may adapt to different article transportation destinations and choose efficient transportation paths, and the real-time situation of the destinations may be verified, so as to ensure the normal and successful delivery of the articles and improve the reliability of the robot in article transportation.

Optionally, in the S1, shooting the region environment of the user and the user to obtain the first image including the specific target object present in the region environment and the face region of the user and performing the analytic processing on the first image to obtain the first feature information about the specific target object and the second feature information about the face region of the user specifically includes:

scanning and shooting the region environment of the user and the face region of the user to obtain the first image including the specific target object present in the region environment and the face region of the user; where the specific target object includes an environment position identifier present in the region environment; and performing an image footage element contour recognition processing on the first image to obtain first contour feature information of the specific target object in the image footage and second contour feature information of the face region of the user in the image footage;

and in the S1, generating the delivery request message according to the first feature information and the second feature information, and sending the delivery request message to the corresponding mobile robot specifically includes:

determining symbol semantic information of the environment position identifier according to the first contour feature information, and then determining position information of the region environment of the user according to the symbol semantic information;

determining weight information of an article transported by the mobile robot as required by the user according to the article transportation information of the user;

determining moving power consumption of the mobile robot completing a current article transportation task according to the position information and the weight information, and selecting a matching mobile robot according to the moving power consumption;

and packaging the position information and the second contour feature information to form the delivery request message, and sending the delivery request message to a selected mobile robot.

The technical scheme has the following advantages: in practical work, user terminals such as smart phones may be used to scan and shoot the region environment of the user and the face region of the user, so that the specific target object in the scene part of the region environment of the user and the face region of the user may be shot simultaneously; the specific target object may be, but not limited to, the environment position identifiers such as the house numbers in the region environment of the user, and then the shot image is analyzed and processed to obtain the first contour feature information of the specific target object and the second contour feature information of the face region of the user, so as to facilitate subsequent accurate generation of the delivery request message.

By analyzing the first contour feature information, the symbol semantic information of the corresponding environment position identifier may be determined, and the position information of the current region of the user, that is, the destination position information to which the articles need to be transported, may be obtained; according to the position information and the weight information of the articles to be transported, the moving power consumption of the mobile robot in the process of carrying out the article transportation task may be estimated, which is convenient for the subsequent selection of the mobile robot with remaining power consumption greater than the moving power consumption to perform the article transportation task and ensures the normal completion of the article transportation task; the position information and the second contour feature information are packaged to form the delivery request message, which may correctly instruct the mobile robot to move to the destination and perform the corresponding user authentication operation after arriving at the destination, so as to ensure the normal and successful delivery of the articles.

Optionally, in the S2, determining the moving path for the mobile robot to perform the article transportation according to the delivery request message specifically includes:

determining the moving path for the mobile robot to perform the article transportation according to the position information of the region environment of the user and current position information of the selected mobile robot;

and in the S2, obtaining the obstacle presence information during the moving process of the mobile robot along the moving path, and adjusting the moving state of the mobile robot according to the obstacle presence information until the mobile robot reaches the region position of the user specifically includes:

instructing a camera of the mobile robot to collect a corresponding moving environment scene image when the mobile robot verifies the moving process of the moving path, and performing a recognition processing on a moving environment scene image to determine volume information of an obstacle present on the moving path of the mobile robot and relative position information of the obstacle and the mobile robot; and adjusting a moving speed and a direction of the mobile robot according to the volume information and the relative position information until the mobile robot reaches the region position of the user.

The technical scheme has the following advantages: the mobile robot may be instructed to avoid the obstacles accurately in the moving process of the mobile robot; for example, when there are obstacles on the moving path of the mobile robot, the mobile robot may be instructed to change the moving speed direction according to the volume information of the obstacles, so as to avoid the obstacles, or the mobile robot may be instructed to decelerate in time according to the relative position information of the obstacles and the mobile robot, so as to avoid the collision between the mobile robot and the obstacles.

Optionally, as shown in FIG. 3, adjusting the moving speed and the direction of the mobile robot according to the volume information and the relative position information until the mobile robot reaches the region position of the user specifically includes:

S201, obtaining a moving direction angle value of the mobile robot when the mobile robot makes an evasive passing from a leftmost edge or a rightmost edge of the obstacle according to a distance between the mobile robot and a leftmost edge position point or a rightmost edge position point of the obstacle in the relative position information, a height value of the leftmost edge position point or the rightmost edge position point and a width of the mobile robot by using a following formula (1), as shown in FIG. 4A, $$\theta(a) = \arcsin \frac{L}{2 \times \sqrt{[S(a)]^2 - [H(a)]^2}} \quad (1)$$

where θ(a) represents the moving direction angle value of the mobile robot when the mobile robot makes the evasive passing from an a-th utmost edge side of the obstacle, and when a current moving path direction of the mobile robot is facing the a-th utmost edge side of the obstacle, the evasive passing is realizable by rotating at least an angle of θ(a); where a value of a is 1 or 2, and when a=1, θ(a) represents the moving direction angle value of the mobile robot when the mobile robot makes the evasive passing from the rightmost edge of the obstacle; when a=2, θ(a) represents the moving direction angle value of the mobile robot when the mobile robot makes the evasive passing from the leftmost edge of the obstacle; L represents the width of the mobile robot; H (a) represents the height value of a position point on the utmost edge side in an a-th direction of the obstacle; S (a) represents a distance between the mobile robot and the position point on the utmost edge side in the a-th direction of the obstacle in the relative position information of the mobile robot;

S202, obtaining an optimal controlling and adjusting direction of the mobile robot according to the moving direction angle value of the mobile robot when the mobile robot makes the evasive passing from the leftmost edge or the rightmost edge of the obstacle, a rotating angle of the mobile robot rotating from the current moving path direction to a leftmost edge direction or a rightmost edge direction by using a following formula (2), as shown in FIG. 4B, $$\varphi = \{3 - 2 \times \mathrm{argmin}_{a=1, a=2}[\beta(a) + \theta(a)]\} \times \{\beta\{\mathrm{argmin}_{a=1, a=2}[\beta(a) + \theta(a)]\} + \theta\{\mathrm{argmin}_{a=1, a=2}[\beta(a) + \theta(a)]\}\} \quad (2)$$

where φ represents the optimal controlling and adjusting direction for the mobile robot to make the evasive passing from the current moving path direction; if φ≥0, the mobile robot rotates a φ angle from the current moving path direction to the right and then moves forward to make the evasive passing; if φ<0, the mobile robot rotates a −φ angle from the current moving path direction to the left and then moves forward to make the evasive passing; β(a) represents that a rotating angle value of the mobile robot from the current moving path direction to an a-th utmost edge side direction; argmin$_{a=1,a=2}$[β(a)+θ(a)] represents that a=1 and 2 are substituted into brackets to get an a value to make the brackets get a minimum value;

and S203, determining the moving speed of the mobile robot according to the volume information of the obstacle and a minimum distance value between the mobile robot and the obstacle in the relative position information by using a following formula (3), as shown in FIG. 4C, $$V(t) = V_m \times \left(1 - e^{-\frac{[D(t)]^3}{Q}}\right) + V_0 \times e^{-\frac{[D(t)]^3}{Q}} \quad (3)$$

where V(t) represents the moving speed of the mobile robot at a current moment; $V_m$ represents a maximum moving speed of the mobile robot; $V_0$ represents a minimum moving speed of the mobile robot; t represents the current moment; D(t) represents the minimum distance value between the mobile robot and the obstacle in the relative position information at the current moment; Q represents a volume value of the obstacle in the volume information of the obstacle; e represents a natural constant.

The technical scheme has the following advantages: the moving direction angle value of the mobile robot is obtained when the mobile robot makes the evasive passing from the leftmost edge or the rightmost edge of the obstacle to avoid the obstacle according to the distance between the mobile robot and the leftmost edge position point or rightmost edge position point of the obstacle in the relative position information, the height value of the leftmost edge position point or the rightmost edge position point and the width of the mobile robot by using the formula (1), so that an appropriate angle may be obtained for reliable obstacle avoidance, thus ensuring the reliability of obstacle avoidance and the safety of subsequent automatic obstacle avoidance. Then, according to the above formula (2), the optimal controlling and adjusting direction of the mobile robot is obtained according to the moving direction angle value of the mobile robot when the mobile robot makes the evasive passing from the leftmost edge or the rightmost edge of the obstacle and the rotating angle of the mobile robot from the current moving path direction to a leftmost edge direction or a rightmost edge direction, so as to select the optimal obstacle avoidance mode to avoid obstacles, save system time and improve the system work efficiency. Finally, the moving speed of the mobile robot is determined by using the above formula (3) according to the volume information of the obstacle and the minimum distance value between the mobile robot and the obstacle in the relative position information, so as to ensure the safety in the obstacle avoidance process, and slow down the speed when the obstacle is large to prevent the obstacle from collapsing and damaging the robot, thus ensuring the safety of the system.

Optionally, in the S3, instructing the mobile robot to shoot the current region of the mobile robot, so as to obtain the second image, and extracting the third feature information about the image footage from the second image specifically includes:

instructing the mobile robot to scan and shoot the current region of the mobile robot to obtain the second image when the mobile robot reaches the region position of the user; and extracting a face footage part present in the second image, and performing a face contour recognition processing on the face footage part to obtain third contour feature information corresponding to the face footage part;

and in the S3, controlling whether the mobile robot performs the article unloading operation according to the comparison result between the third feature information and the second feature information specifically includes:

comparing the third contour feature information with the second contour feature information to obtain a contour similarity value of the third contour feature information and the second contour feature information; where if the contour similarity value is greater than or equal to a preset similarity threshold, the mobile robot performs the article unloading operation; and if the contour similarity value is smaller than the preset similarity threshold, the mobile robot doesn't perform the article unloading operation.

The technical scheme has the following advantages: when the mobile robot reaches the region position of the user, the camera of the mobile robot is instructed to scan and shoot the current region of the mobile robot, and then the corresponding third contour feature information is obtained, so as to calibrate the person present in the current environment of the mobile robot. When the contour similarity value between the third contour feature information and the second contour feature information is greater than or equal to the preset similarity threshold, the identity of the person presence condition in the current environment of the mobile robot is consistent with that of the user sent the delivery request message, and at this time, the mobile robot is instructed to perform the article unloading operation, which may ensure that the user may successfully receive the articles and ensure the normal and reliable delivery of the articles.

FIG. 2 is a structural schematic diagram of a control system based on the mobile robot provided by an embodiment of the present application. The control system based on the mobile robot includes:
   a user terminal used for shooting the region environment of the user and the user, and obtaining the first image including the specific target object present in the region environment and the face region of the user; performing the analytic processing on the first image to obtain the first feature information about the specific target object and the second feature information about the face region of the user;
   where the user terminal is also used for generating the delivery request message according to the first feature information, the second feature information and the article transportation information of the user, and sending the delivery request message to the corresponding mobile robot;
   a first robot control terminal used for determining the moving path for the mobile robot to perform the article transportation according to the delivery request message;
   where the first robot control terminal is also used for obtaining the obstacle presence information during the moving process of the mobile robot along the moving path, and adjusting the moving state of the mobile robot according to the obstacle presence information until the mobile robot reaches the region position of the user; and
   a second robot control terminal used for instructing the mobile robot to shoot the current region of the mobile robot, so as to obtain the second image, and extracting the third feature information about the image footage from the second image;
   where the second robot control terminal is also used for controlling whether the mobile robot performs the article unloading operation according to the comparison result between the third feature information and the second feature information.

The technical scheme has the following advantages: the control system based on the mobile robot correspondingly obtain first feature information of the user and second feature information according to a specific target object present in the region environment and a face region of the user, and a delivery request message is sent to the mobile robot; the obstacle presence information is obtained during the moving process of the mobile robot along the moving path so as to adjust the moving state of the mobile robot; the corresponding third feature information is obtained according to the image of the current region of the mobile robot when the mobile robot is instructed to reach the region position of the user; whether the mobile robot performs an article unloading operation is controlled according to a comparison result between the third feature information and the second feature information; the moving path of the mobile robot may be determined according to the region of the user, so that the mobile robot may adapt to different article transportation destinations and choose efficient transportation paths, and the real-time situation of the destinations may be verified, so as to ensure the normal and successful delivery of the articles and improve the reliability of the robot in article transportation.

Optionally, shooting the region environment of the user and the user to obtain the first image including the specific target object present in the region environment and the face region of the user and performing the analytic processing on the first image to obtain the first feature information about the specific target object and the second feature information about the face region of the user the user terminal specifically includes:
   scanning and shooting the region environment of the user and the face region of the user by the user terminal to obtain the first image including the specific target object present in the region environment and the face region of the user; where the specific target object includes the environment position identifier present in the region environment; and
   performing the image footage element contour recognition processing on the first image to obtain the first contour feature information of the specific target object in the image footage and the second contour feature information of the face region of the user in the image footage;
   where generating the delivery request message according to the first feature information, the second feature information and the article transportation information of the user, and sending the delivery request message to the corresponding mobile robot by the user terminal specifically includes:
   determining the symbol semantic information of the environment position identifier according to the first contour feature information, and then determining the position information of the region environment of the user according to the symbol semantic information by the user terminal;
   determining the weight information of the article transported by the mobile robot as required by the user according to the article transportation information of the user;
   determining the moving power consumption of the mobile robot completing the current article transportation task according to the position information and the weight information, and sending the moving power consumption to a mobile robot management platform, so as to select the matching mobile robot; and
   then packaging the position information and the second contour feature information to form the delivery request message, and sending the delivery request message to the selected mobile robot.

The technical scheme has the following advantages: in practical work, user terminals such as smart phones may be used to scan and shoot the region environment of the user and the face region of the user, so that the specific target object in the scene part of the region environment of the user and the face region of the user may be shot simultaneously; the specific target object may be, but not limited to, the environment position identifiers such as the house numbers in the region environment of the user, and then the shot image is analyzed and processed to obtain the first contour feature information of the specific target object and the second contour feature information of the face region of the user, so as to facilitate subsequent accurate generation of the delivery request message.

By analyzing the first contour feature information, the symbol semantic information of the corresponding environment position identifier may be determined, and the position information of the current region of the user, that is, the destination position information to which the articles need to be transported, may be obtained; according to the position information and the weight information of the articles to be transported, the moving power consumption of the mobile robot in the process of carrying out the article transportation task may be estimated, which is convenient for the subsequent selection of the mobile robot with remaining power consumption greater than the moving power consumption to perform the article transportation task and ensures the normal completion of the article transportation task; the position information and the second contour feature information are packaged to form the delivery request message, which may correctly instruct the mobile robot to move to the destination and perform the corresponding user authentication operation after arriving at the destination, so as to ensure the normal and successful delivery of the articles.

Optionally, determining the moving path for the mobile robot to perform the article transportation according to the delivery request message by the first robot control terminal specifically includes:
  determining the moving path for the mobile robot to perform the article transportation according to the position information of the region environment of the user and current position information of the selected mobile robot;
  and obtaining the obstacle presence information during the moving process of the mobile robot along the moving path, and adjusting the moving state of the mobile robot according to the obstacle presence information until the mobile robot reaches the region position of the user by the first robot control terminal specifically includes:
  instructing the camera of the mobile robot to collect the corresponding moving environment scene image, and performing the recognition processing on the moving environment scene image to determine the volume information of the obstacle present on the moving path of the mobile robot and the relative position information of the obstacle and the mobile robot by the first robot control terminal; and
  adjusting the moving speed and the direction of the mobile robot according to the volume information and the relative position information until the mobile robot reaches the region position of the user.

The technical scheme has the advantages: by the method above, the mobile robot may be instructed to avoid the obstacles accurately in the moving process of the mobile robot; for example, when there are obstacles on the moving path of the mobile robot, the mobile robot may be instructed to change the moving speed direction according to the volume information of the obstacles, so as to avoid the obstacles, or the mobile robot may be instructed to decelerate in time according to the relative position information of the obstacles and the mobile robot, so as to avoid the collision between the mobile robot and the obstacles.

Optionally, instructing the mobile robot to shoot the current region of the mobile robot, so as to obtain the second image, and extracting the third feature information about the image footage from the second image by the second robot control terminal specifically includes:
  instructing the mobile robot by the second robot control terminal to scan and shoot the current region of the mobile robot to obtain the second image when the mobile robot reaches the region position of the user;
  extracting the face footage part present in the second image, and performing the face contour recognition processing on the face footage part to obtain the third contour feature information corresponding to the face footage part;
  and controlling whether the mobile robot performs the article unloading operation according to the comparison result between the third feature information and the second feature information by the second robot control terminal specifically includes:
  comparing the third contour feature information with the second contour feature information by the second robot control terminal to obtain the contour similarity value of the third contour feature information and the second contour feature information; where if the contour similarity value is greater than or equal to the preset similarity threshold, the mobile robot performs the article unloading operation; and if the contour similarity value is smaller than the preset similarity threshold, the mobile robot doesn't perform the article unloading operation.

The technical scheme has the following advantages that: by adopting the method above, when the mobile robot reaches the region position of the user, the camera of the mobile robot is instructed to scan and shoot the current region of the mobile robot, and then the corresponding third contour feature information is obtained, so as to calibrate the person presence condition in the current environment of the mobile robot. When the contour similarity value between the third contour feature information and the second contour feature information is greater than or equal to the preset similarity threshold, the identity of the person present in the current environment of the mobile robot is consistent with that of the user sent the delivery request message, and at this time, the mobile robot is instructed to perform the article unloading operation, which may ensure that the user may successfully receive the articles and ensure the normal and reliable delivery of the articles.

As can be seen from the contents of the above embodiments, the control method and the control system based on the mobile robot correspondingly obtain first feature information and second feature information according to a specific target object present in the region environment of the user and a face region of the user, and a delivery request message is sent to the mobile robot; the obstacle presence information is obtained during the moving process of the mobile robot along the moving path so as to adjust the moving state of the mobile robot; the corresponding third feature information is obtained according to the image of the current region of the mobile robot when the mobile robot is instructed to reach the region position of the user; whether the mobile robot performs an article unloading operation is controlled according to a comparison result between the third feature information and the second feature information;

the moving path of the mobile robot may be determined according to the region of the user, so that the mobile robot may adapt to different article transportation destinations and choose efficient transportation paths, and the real-time situation of the destinations may be verified, so as to ensure the normal and successful delivery of the articles and improve the reliability of the robot in article transportation.

Obviously, those skilled in the art may make various modifications and variations to the present application without departing from the spirit and scope of the present application. Any changes or replacements that may be easily thought of by a person skilled in the art within the technical scope disclosed in this application may be included in the protection scope of this application. Therefore, the protection scope of this application may be based on the protection scope of the claims.

What is claimed is:

1. A control method based on a mobile robot, comprising following steps:
(S1), shooting a region environment of a user and the user to obtain a first image comprising a specific target object present in the region environment and a face region of the user; performing an analytic processing on the first image to obtain first feature information about the specific target object and second feature information about the face region of the user; generating a delivery request message according to the first feature information, the second feature information and article transportation information of the user, wherein the article transportation information of the user comprises weight information of the article required to be transported by the user, and sending the delivery request message to a corresponding mobile robot;
(S2), determining a moving path for the mobile robot to perform an article transportation according to the delivery request message; obtaining obstacle presence information during a moving process of the mobile robot along the moving path, and adjusting a moving state of the mobile robot according to the obstacle presence information until the mobile robot reaches a region position of the user;
and (S3), instructing the mobile robot to shoot a current region of the mobile robot, so as to obtain a second image, and extracting third feature information about an image footage from the second image; controlling whether the mobile robot performs an article un loading operation according to a comparison result between the third feature information and the second feature information;
wherein in the (S1), shooting the region environment of the user and the user to obtain the first image comprising the specific target object present in the region environment and the face region of the user and performing the analytic processing on the first image to obtain the first feature information about the specific target object and the second feature information about the face region of the user specifically comprises:
scanning and shooting the region environment of the user and the face region of the user to obtain the first image comprising the specific target object present in the region environment and the face region of the user; wherein the specific target object comprises an environment position identifier present in the region environment; and
performing an image footage element contour recognition processing on the first image to obtain first contour feature information of the specific target object in the image footage and second contour feature information of the face region of the user in the image footage;
and in the (S1), generating the delivery request message according to the first feature information and the second feature information, and sending the delivery request message to the corresponding mobile robot specifically comprises:
determining symbol semantic information of the environment position identifier according to the first contour feature information, and then determining position information of the region environment of the user according to the symbol semantic information;
determining weight information of an article transported by the mobile robot as required by the user according to the article transportation information of the user;
determining moving power consumption of the mobile robot completing a current article transportation task according to the position information and the weight information, and selecting a matching mobile robot according to the moving power consumption;
and packaging the position information and the second contour feature information to form the delivery request message, and sending the delivery request message to a selected mobile robot; and in the (S2), determining the moving path for the mobile robot to perform the article transportation according to the delivery request message specifically comprises:
determining the moving path for the mobile robot to perform the article transportation according to the position information of the region environment of the user and current position information of the selected mobile robot;
and in the (S2), obtaining the obstacle presence information during the moving process of the mobile robot along the moving path, and adjusting the moving state of the mobile robot according to the obstacle presence information until the mobile robot reaches the region position of the user specifically comprises:
instructing a camera of the mobile robot to collect a corresponding moving environment scene image when the mobile robot verifies the moving process of the moving path, and performing a recognition processing on a moving environment scene image to determine volume information of an obstacle present on the moving path of the mobile robot and relative position information of the obstacle and the mobile robot; and
adjusting a moving speed and a direction of the mobile robot according to the volume information and the relative position information until the mobile robot reaches the region position of the user;
and in the (S2), adjusting the moving speed and the direction of the mobile robot according to the volume information and the relative position information until the mobile robot reaches the region position of the user specifically comprises:
(S201), obtaining a moving direction angle value of the mobile robot when the mobile robot makes an evasive passing from a leftmost edge or a rightmost edge of the obstacle according to a distance between the mobile robot and a leftmost edge position point or a rightmost edge position point of the obstacle in the relative position information, a height value of the leftmost edge position point or the rightmost edge position point and a width of the mobile robot by using a following formula (1), $$\theta(a) = \arcsin \frac{L}{2 \times \sqrt{[S(a)]^2 - [H(a)]^2}} \quad (1)$$

Wherein θ(a) represents the moving direction angle value of the mobile robot when the mobile robot makes the evasive passing from an a-th utmost edge side of the obstacle, and when a current moving path direction of the mobile robot is facing the a-th utmost edge side of the obstacle, the evasive passing is realizable by rotating at least an angle of θ(a); wherein a value of a is 1 or 2, and when a=1, θ(a) represents the moving direction angle value of the mobile robot when the mobile robot makes the evasive passing from the rightmost edge of the obstacle; when a=2, θ(a) represents the moving direction angle value of the mobile robot when the mobile robot makes the evasive passing from the leftmost edge of the obstacle; L represents the width of the mobile robot; H(a) represents the height value of a position point on the utmost edge side in an a-th direction of the obstacle; S(a) represents a distance between the mobile robot and the position point on the utmost edge side in the a-th direction of the obstacle in the relative position information of the mobile robot;

(S202), obtaining an optimal controlling and adjusting direction of the mobile robot according to the moving direction angle value of the mobile robot when the mobile robot makes the evasive passing from the leftmost edge or the rightmost edge of the obstacle, a rotating angle of the mobile robot rotating from the current moving path direction to a leftmost edge direction or a rightmost edge direction by using a following formula (2), $$\varphi = \{3 - 2 \times \mathrm{argmin}_{a=1, a=2}[\beta(a) + \theta(a)]\} \times \{\beta\{\mathrm{argmin}_{a=1, a=2}[\beta(a) + \theta(a)]\} + \theta\{\mathrm{argmin}_{a=1, a=2}[\beta(a) + \theta(a)]\}\} \quad (2)$$

wherein, φ represents the optimal controlling and adjusting direction for the mobile robot to make the evasive passing from the current moving path direction; If φ>=0, the mobile robot rotates a p angle from the current moving path direction to the right and then moves forward to make the evasive passing; if φ<0, the mobile robot rotates a −p angle from the current moving path direction to the left and then moves forward to make the evasive passing; β(a) represents that a rotating angle value of the mobile robot from the current moving path direction to an a-th utmost edge side direction; $\mathrm{argmin}_{a=1, a=2}[\beta(a) + \theta(a)]$ represents that a=1 and 2 are substituted into brackets to get an a value to make the brackets get a minimum value;

and (S203), determining the moving speed of the mobile robot according to the volume information of the obstacle and a minimum distance value between the mobile robot and the obstacle in the relative position information by using a following formula (3)

$$V(t) = V_m \times \left(1 - e^{-\frac{[D(t)]^3}{Q}}\right) + V_0 \times e^{-\frac{[D(t)]^3}{Q}} \quad (3)$$

wherein V(t) represents the moving speed of the mobile robot at a current moment; $V_m$ represents a maximum moving speed of the mobile robot; $V_0$ represents a minimum moving speed of the mobile robot; t represents the current moment; D(t) represents the minimum distance value between the mobile robot and the obstacle in the relative position information at the current moment; Q represents a volume value of the obstacle in the volume information of the obstacle; e represents a natural constant.

2. The control method based on the mobile robot according to claim 1,
wherein
in the (S3), instructing the mobile robot to shoot the current region of the mobile robot, so as to obtain the second image, and extracting the third feature information about the image footage from the second image specifically comprises:
instructing the mobile robot to scan and shoot the current region of the mobile robot to obtain the second image when the mobile robot reaches the region position of the user; and
extracting a face footage part present in the second image, and performing a face contour recognition processing on the face footage part to obtain third contour feature information corresponding to the face footage part;
and in the (S3), controlling whether the mobile robot performs the article unloading operation according to the comparison result between the third feature information and the second feature information specifically comprises:
comparing the third contour feature information with the second contour feature information to obtain a contour similarity value of the third contour feature information and the second contour feature information; wherein if the contour similarity value is greater than or equal to a preset similarity threshold, the mobile robot performs the article unloading operation; and if the contour similarity value is smaller than the preset similarity threshold, the mobile robot doesn't perform the article unloading operation.

3. A control system based on the mobile robot, controlling the mobile robot by using the control method according to claim 1, comprising:
a user terminal used for shooting the region environment of the user and the user, and obtaining the first image comprising the specific target object present in the region environment and the face region of the user; performing the analytic processing on the first image to obtain the first feature information about the specific target object and the second feature information about the face region of the user;
wherein the user terminal is also used for generating the delivery request message according to the first feature information, the second feature information and the article transportation information of the user, and sending the delivery request message to the corresponding mobile robot;
a first robot control terminal used for determining the moving path for the mobile robot to perform the article transportation according to the delivery request message;
wherein the first robot control terminal is also used for obtaining the obstacle presence information during the moving process of the mobile robot along the moving path, and adjusting the moving state of the mobile robot according to the obstacle presence information until the mobile robot reaches the region position of the user; and
a second robot control terminal used for instructing the mobile robot to shoot the current region of the mobile robot, so as to obtain the second image, and extracting the third feature information about the image footage from the second image;

wherein the second robot control terminal is also used for controlling whether the mobile robot performs the article unloading operation according to the comparison result between the third feature information and the second feature information.

4. The control system based on the mobile robot according to claim 3, wherein shooting the region environment of the user and the user to obtain the first image comprising the specific target object present in the region environment and the face region of the user and performing the analytic processing on the first image to obtain the first feature information about the specific target object and the second feature information about the face region of the user by the user terminal specifically comprises:

scanning and shooting the region environment of the user and the face region of the user by the user terminal to obtain the first image comprising the specific target object present in the region environment and the face region of the user; wherein the specific target object comprises the environment position identifier present in the region environment; and performing the image footage element contour recognition processing on the first image to obtain the first contour feature information of the specific target object in the image footage and the second contour feature information of the face region of the user in the image footage;

wherein generating the delivery request message according to the first feature information, the second feature information and the article transportation information of the user, and sending the delivery request message to the corresponding mobile robot by the user terminal specifically comprises:

determining the symbol semantic information of the environment position identifier according to the first contour feature information, and then determining the position information of the region environment of the user according to the symbol semantic information by the user terminal;

determining the weight information of the article transported by the mobile robot as required by the user according to the article transportation information of the user;

determining the moving power consumption of the mobile robot completing the current article transportation task according to the position information and the weight information, and sending the moving power consumption to a mobile robot management platform, so as to select the matching mobile robot; and then packaging the position information and the second contour feature information to form the delivery request message, and sending the delivery request message to the selected mobile robot.

5. The control system based on the mobile robot according to claim 4, wherein determining the moving path for the mobile robot to perform the article transportation according to the delivery request message by the first robot control terminal specifically comprises:

determining the moving path for the mobile robot to perform the article transportation according to the position information of the region environment of the user and the current position information of the selected mobile robot;

and obtaining the obstacle presence information during the moving process of the mobile robot along the moving path, and adjusting the moving state of the mobile robot according to the obstacle presence information until the mobile robot reaches the region position of the user by the first robot control terminal specifically comprises:

instructing the camera of the mobile robot to collect the corresponding moving environment scene image, and performing the recognition processing on the moving environment scene image to determine the volume information of the obstacle present on the moving path of the mobile robot and the relative position information of the obstacle and the mobile robot by the first robot control terminal; and adjusting the moving speed and the direction of the mobile robot according to the volume information and the relative position information until the mobile robot reaches the region position of the user.

6. The control system based on the mobile robot according to claim 5, wherein instructing the mobile robot to shoot the current region of the mobile robot, so as to obtain the second image, and extracting the third feature information about the image footage from the second image by the second robot control terminal specifically comprises:

instructing the mobile robot by the second robot control terminal to scan and shoot the current region of the mobile robot to obtain the second image when the mobile robot reaches the region position of the user; and extracting the face footage part present in the second image, and performing the face contour recognition processing on the face footage part to obtain the third contour feature information corresponding to the face footage part;

and controlling whether the mobile robot performs the article unloading operation according to the comparison result between the third feature information and the second feature information by the second robot control terminal specifically comprises:

comparing the third contour feature information with the second contour feature information by the second robot control terminal to obtain the contour similarity value of the third contour feature information and the second contour feature information; wherein if the contour similarity value is greater than or equal to the preset similarity threshold, the mobile robot performs the article unloading operation; and if the contour similarity value is smaller than the preset similarity threshold, the mobile robot doesn't perform the article unloading operation.

* * * * *